Patented Jan. 8, 1952

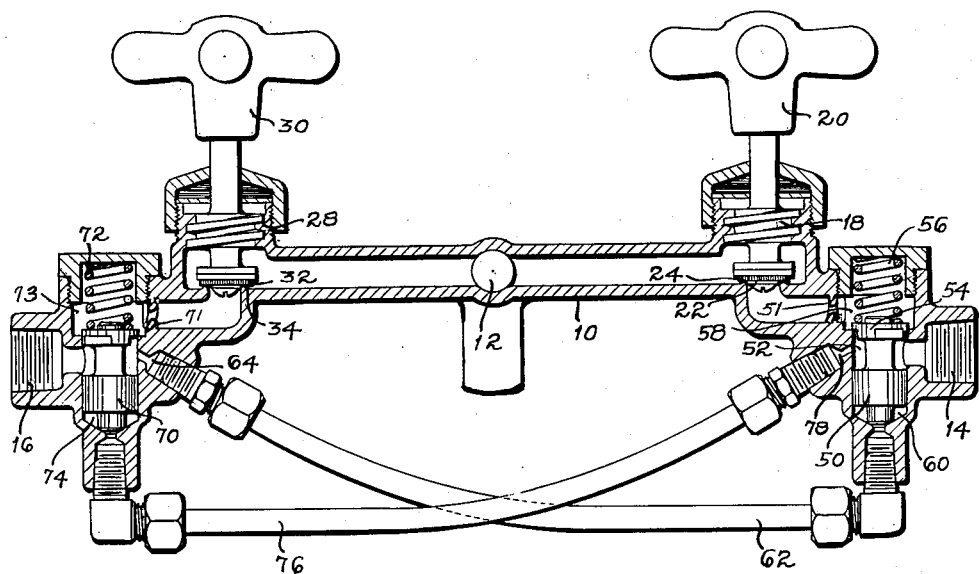

2,581,855

UNITED STATES PATENT OFFICE 2,581,855

VALVE

Raymond C. Griffith, Detroit, Mich.

Application February 18, 1947, Serial No. 729,310

4 Claims. (Cl. 137—144)

This invention relates to a valve and more particularly to a pressure responsive valve.

An object of this invention is to provide a valve assembly such that fluids emanating from more than one source are so regulated or controlled that in the event there is a change in the pressure of one or more of the fluids, a valve or valves are actuated in response to change in the pressure of one of the fluids to thereby alter the quantity of fluid flowing from another source.

Another object of this invention is to provide a mixing valve for use in regulating the flow of water or other fluids, such as the water supply to a shower bath, so that in the event the relative pressures of the main supply of fluid through the mixing valve changes, the valve mechanism will be adjusted to compensate for this change in pressure.

Another object of this invention is to provide an attachment for mixing valves now in use, which attachment provides a valve that is responsive to changes in pressure in another main, to thereby adjust the relative openings for the flow of the fluid.

Other objects and advantages reside in the construction of parts, the combination thereof and the mode of operation, as will become more apparent from the following description.

Referring to the drawings, Figure 1 is a cross sectional view of the valve assembly.

Figure 2 is an exploded view of a modification.

Figure 3 is a cross sectional view taken substantially on the line 3—3 of Figure 2.

In the drawings, the reference character 10 indicates the main body member of a mixing valve provided with a discharge outlet 12, a cold water intake 14 and a hot water intake 16. A conventional valve member 18, actuated by a handle 20 and provided with a washer 22, engaging a valve seat 24, is used in controlling the flow of cold water under normal operating conditions. A valve member 28 actuated by a handle 30 and provided with a washer 32 engaging a valve seat 34, is used to normally control the flow of hot water. The structure described thus far, aside from the main body member, may constitute conventional mixing valves, either with or without a thermostatic control.

In conventional mixing valves used for shower baths and the like, there may be a sudden rise or drop in temperature, due to change in water pressure, either of the hot water supply or the cold water supply. If, for example, the valve members 18 and 28 are adjusted so as to supply water at the proper temperature, and then for some reason beyond the control of the bather, the pressure in the cold water may drop very suddenly, without any notice to the bather, the temperature of the shower may rise very rapidly, which may result in serious injury. On numerous occasions such injuries have been fatal. Thermostatic controls for maintaining a uniform temperature are too slow in their operation to adjust the valves so as to maintain a constant temperature. Especially is this true in the event the flow of cold water is completely interrupted or reduced to a mere trickle.

In order to eliminate this hazard, cross controls have been provided, such that in the event there is a sudden, or for that matter, a gradual change in the pressure in one of the water mains, without a corresponding change of pressure in the other water main, the relative flow from the water mains will be adjusted proportionately. This adjusting mechanism will now be described.

Adjacent the cold water intake 14, there is located a floating valve member 50, provided with a channel 52, located below the head 54. A spring 56 is mounted above the head 54. This spring functions as a resilient stop, so as to limit the movement of the valve 50 upwardly. The head 54 is loosely seated in the orifice, so that when the valve 18 is opened, cold water will flow around the head 54. The cavity 60 below the valve member 50, as viewed in Figure 1, is connected by a suitable conduit 62 to an orifice 64 communicating with the hot water intake 16. This permits the hot water pressure to be applied below the valve member 50. Due to balanced areas, pressure in channel 52 will have no tendency to move valve member 50 and leakage by head 54 will create pressure in chamber 58 equal to cold water pressure in 14. Thus, when valve 18 is clsoed, cold water pressure will be applied to head 54 of valve 50 and hot water pressure will be below valve 50 in cavity 60, and valve 50 will be opened or closed, depending upon whichever pressure is the greater. When valve 18 is opened, the immediate effect will be to drop pressure in cavity 58 due to the out flow of water and valve 50 will rise due to hot water pressure in cavity 60. Valve 50 will now assume a position against the spring stop or at some intermediate position in which the cold water pressure in chamber 58 balances hot water pressure in chamber 60. This latter condition is possible because head 54 is so made that restriction to flow around it is very low when in the wide open position and restriction 51 is placed in the outlet of chamber 58, thus causing pres- 2,581,855 sure in chamber 58 to be nearly equal to pressure in channel 52 when valve 50 is raised against its stop. If pressure in channel 52 and hence chamber 58 becomes greater than pressure in cavity 60, valve 50 will lower until head 54 restricts flow from channel 52 to chamber 58 sufficiently to cause pressure in chamber 58 to equal pressure in chamber 60.

As may best be seen by referring to the left of Figure 1, a floating valve member 70 is limited in its movement by a spring 72 adjacent the hot water intake opening 16. The cavity 74 below the valve member 70, as viewed in Figure 1, is connected by a conduit member 76 to the orifice 78, communicating with the cold water intake 14. Upon the valve member 28 being opened, the valve member 70 is raised in a manner similar to that described in connection with member 50, so as to allow hot water to flow from the intake opening out through the discharge outlet or orifice 12. The valve members 18 and 28, upon being adjusted, will supply water through the discharge outlet 12 at the desired temperature, assuming that both hot and cold water is available.

It will be seen that pressures in chamber 58 above valve 50 and chamber 73 above valve 70 will always be equal to each other, the higher inlet pressure being restricted to equal the lower. Assuming the pressure of hot and cold water at 16 and 14 to be equal, valves 70 and 50 will be open against their stops. In the event the pressure of the cold water should suddenly drop, the pressure in cavity 74 communicating through the conduit member 76 with the cold water intake 14 would reduce equal to the reduction of pressure in the cold water main. This would result in the pressure in chamber 73 above valve 70 being greater than that in cavity 74 which would be an unbalanced condition and valve 70 would instantly close, to restrict flow of hot water in chamber 73 until pressure in chamber 73 equals pressure in cavity 74. At the same time, pressure in chamber 58 has reduced equal to the reduction in cold water pressure and again, pressures in chamber 58 and chamber 73 equal each other. It is thus possible to maintain a substantially constant temperature of the water escaping from the outlet 12. In the event the pressure of the cold water should drop to substantially atmospheric pressure, the valve member 70 would close the hot water orifice, so that a mere trickle of hot water would escape, thereby greatly reducing, if not completely eliminating the chances of scalding.

On the other hand, if the cold water pressure should increase, the operation of the mechanism is such that the cold water valve member 50 would partially close the cold water orifice, thereby maintaining a balance between the hot and cold water flow. The same would hold true in the event there is a sudden change in the pressure in the hot water intake.

In the preferred embodiment, the conduits 62 and 76 could be formed in the main body member, so as to constitute a unitary member.

In the modification disclosed in Figure 2 a body member 100, provided with an intake opening 14 and an outlet opening 102, is adapted for use with an installation that has already been made or for use with conventional mixing valves now on the market. In order to make the proper cross connection, two body members 100 could be used, one for the cold water and one for the hot water. These would be cross connected by suitable conduits 104 and 106, corresponding to the cross conduits 76 and 62 respectively. The ends of the conduits 104 and 106 may be flared and clamped in position by the nuts 108 and 110, the former connected by a nipple 112 and the latter by a T 114 to the main body member 100. The operating parts 50, 54 and 56, adapted to be inserted into the cavity in member 100, are identical to those described in connection with the preferred embodiment. This attachment disclosed in the modification is easily produced and may be added to conventional mixing valves for a nominal expenditure. Furthermore, by utilizing pipes for the cross connection, this attachment is flexible for use with various sizes and makes of mixing valves.

Although the device has been described in connection with hot and cold water mains, it is to be understood that the device is not limited to use in connection with hot and cold water mains. Within the purview of this invention it could be used in controlling the flow of chemicals from separate sources. Throughout the claims, hot and cold water mains have been referred to with the intent that hot and cold water mains here are used to designate fluid passages, irrespective of the type of fluid used.

If the restriction to flow in outlet passages from chamber 58 and chamber 73 to outlet orifices is sufficient to maintain proper pressure in these chambers, restrictions 51 and 71 may be eliminated without any deleterious effects. Springs 56 and 72 may also be eliminated without affecting the operation of the device, their only purpose being to cushion the upward movement of valves 50 and 70 which move at all times in response to relative changes in hot and cold water pressure even though valves 18 and 28 may be completely closed. This provides a continuous self cleaning action for valves 50 and 70 in their bores.

In the event either hot or cold water pressure should remain substantially different from the other, over an extended period of time, interflow between hot and cold water mains through conduit members 62 and 76 is practically eliminated by fitting valves 50 and 70 very closely in their bores.

In the event the outlet passages do not normally offer sufficient restriction, the passages may be restricted by barriers 51 and 71, which in reality, are reduced orifices.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An attachment for use with a conventional mixing valve connected to hot and cold water mains, said attachment including a pair of main body members adapted to be connected in series respectively with the hot water main and the cold water main leading to the mixing valve, each of said body members having a cylindrical cavity provided with a valve seat portion, each of said body members having an outlet passage from the cylindrical cavity for communicating with a conduit leading to the mixing valve, each of said main body members having an intake passage extending from the cylindrical cavity and adapted to communicate with a water main, a pair of valve members located in the cylindrical cavity, there being one valve member for each cavity, each of said valve members being associated with its seat portion, each of said valve members functioning as a piston mounted in the cylindrical cavity, resilient means for urging each of said valve members towards one end of its associated cylindrical cavity to engage the seat portion to thereby close the water passage, each of said valve members being provided with an annular groove registering with its associated intake passage, each of said body members having a passage extending laterally through the main body member in communication with the annular groove, a second passage extending from the end of the cylindrical cavity toward which the valve member is normally urged, and conduit means for cross connecting the lateral passage of one body member to the end passage of the other body member so that the water pressure applied to one body member is applied to the end of the piston in the opposite body member to urge the piston against the resilient means to open the valve, the extent to which the valve is opened being adjusted in response to changes in the intake pressure in the opposite body member.

2. A mixing valve assembly for use in hot and cold water mains including a main body member provided with a longitudinal passage communicating with a discharge passage, said main body member having a pair of intake openings, one adapted to communicate with the hot water main and the other adapted to communicate with the cold water main, said main body member being provided with a pair of cylindrical cavities each having a valve seat in one end thereof, said cylindrical cavities communicating with the opposite ends of the longitudinal passage connected to the discharge passage so that one end of a cylindrical cavity communicates with one end of the longitudinal passage and one end of the other cylindrical cavity communicates with the other end of the longitudinal passage, the hot water intake opening extending through the side wall of one of the cylindrical cavities and the cold water intake opening extending through the side wall of the other cylindrical cavity, a pair of valve seats in the longitudinal passage, a pair of valve members one for each of the valve seats cooperating therewith, one of the valve members closing the hot water passage and the other valve member closing the cold water passage, said valve members being located between the outlet passage and the respective cylindrical cavities, a side passage extending through the side wall of one of the cylindrical cavities, a side passage extending through the side wall of the other cylindrical cavity, a pair of piston members mounted in the cylindrical cavities, there being one piston member for each cavity, said piston members having peripheral grooves registering with the intake openings of the side passages, resilient means urging each piston member towards one end of its associated cylindrical cavity and into engagement with its associated valve seat, said body member having end passages extending from the cylindrical cavities, said end passages extending from the end of the cylindrical cavities towards which the piston members are normally urged, a conduit extending from the end passage of the cylindrical cavity having an opening adapted to be connected to the hot water main, said conduit being connected to the side passage of the cylindrical cavity adapted to be associated with the cold water main, and a second conduit extending from the end passage of the cylindrical cavity adapted to be associated with the cold water main, said conduit being connected to the side passage of the cylindrical cavity adapted to be associated with the hot water main, one end of each piston member cooperating with the valve seat of its associated cylindrical cavity to function as a valve, the other end of the piston being actuated by the fluid pressure in the conduit extending from the end of the cylindrical cavity associated with the side passage of the other cavity to actuate the piston member to open the valve.

3. An attachment for use with a conventional mixing valve connected to hot and cold water mains, said attachment including a pair of main body members adapted to be connected in series respectively with the hot water main and the cold water main leading to the mixing valve, each of said body members having a cylindrical cavity provided with a valve seat portion, each of said body members having an outlet passage from the cylindrical cavity communicating with a conduit leading to the mixing valve, each of said main body members having an intake passage extending from the cylindrical cavity adapted to communicate with a water main, a pair of valve members located in the cylindrical cavities, there being one valve member for each cavity, each of said valve members being associated with its seat portion, each of said valve members functioning as a piston mounted in the cylindrical cavity, means for urging the valve members into engagement with the respective valve seat portion, each of said valve members being provided with an annular groove registering with its associated intake passage, each of said body members having a passage extending laterally through the main body member in communication with the annular groove, a second passage extending from the end of the cylindrical cavity toward which the valve member is normally urged, and conduit means cross connecting the lateral passage of one body member to the end passage of the other body member so that the water pressure applied to one body member is applied to the end of the piston in the opposite body member to urge the piston away from its seat portion to open the valve, the extent to which the valve is opened being adjusted in response to changes in the intake pressure in the opposite body member.

4. A mixing valve assembly for use in hot and cold water mains including a main body member provided with a longitudinal passage communicating with a discharge passage, said main body member having a pair of intake openings, one adapted to communicate with the hot water main and the other adapted to communicate with the cold water main, said main body member being provided with a pair of cylindrical cavities each having a valve seat in one end thereof, said cylindrical cavities communicating with the opposite ends of the longitudinal passage connected to the discharge passage so that one end of a cylindrical cavity communicates with one end of the longitudinal passage and one end of the other cylindrical cavity communicates with the other end of the longitudinal passage, the hot water intake opening extending through the side wall of one of the cylindrical cavities and the cold water intake opening extending through the side wall of the other cylindrical cavity, a pair of valve seats in the longitudinal passage, a pair of valve members one for each of the valve seats cooperating therewith, one of the valve members being adapted to close the hot water passage and the other valve member being adapted to close the cold water passage, said valve members being located between the outlet passage and the cylindrical cavities, a side passage extending through the side wall of one of the cylindrical cavities, a side passage extending through the side wall of the other cylindrical cavity, a pair of piston members mounted in the cylindrical cavities each piston member having a valve head for cooperation with its associated seat in the cavity, means for urging said head into engagement with its seat, there being one piston member for each cavity, said piston members having peripheral grooves registering with the intake openings of the side passages, said body member having end passages extending from the cylindrical cavities, said end passages extending from the end of the cylindrical cavities opposite the end of the cylindrical cavity adapted to communicate with the discharge passage, a conduit extending from the end passage of the cylindrical cavity having an opening adapted to be connected to the hot water main, said conduit being connected to the side passage of the cylindrical cavity adapted to be associated with the cold water main, and a second conduit extending from the end passage of the cylindrical cavity adapted to be associated with the cold water main, said conduit being connected to the side passage of the cylindrical cavity adapted to be associated with the hot water main, one end of each piston member cooperating with its associated cylindrical cavity to function as a valve, the other end of the piston member being actuated by the fluid pressure in the conduit extending from the end of the cylindrical cavity associated with the side passage of the other cavity.

RAYMOND C. GRIFFITH.

REFERENCES CITED

The following references are of record in the file of this patent:

UNITED STATES PATENTS

| Number | Name | Date |
| --- | --- | --- |
| 1,443,675 | Bowler | Jan. 30, 1923 |
| 1,508,938 | Powers et al. | Sept. 10, 1924 |
| 2,032,641 | Thomas | Mar. 3, 1936 |
| 2,200,578 | Mahon | May 14, 1940 |